(12) United States Patent
Wierzbicki

(10) Patent No.: US 7,293,181 B2
(45) Date of Patent: Nov. 6, 2007

(54) USE OF ONE VOLTAGE REGULATOR MODULE TO SUPPORT TWO PROCESSORS TO IMPROVE POWER AND THERMAL LIMITATIONS

(75) Inventor: Robert P. Wierzbicki, Worcester, MA (US)

(73) Assignee: EMC Corporation, Hopkinton, MA (US)

( * ) Notice: Subject to any disclaimer, the term of this patent is extended or adjusted under 35 U.S.C. 154(b) by 408 days.

(21) Appl. No.: 10/878,300

(22) Filed: Jun. 28, 2004

(65) Prior Publication Data

US 2006/0069927 A1 Mar. 30, 2006

(51) Int. Cl.
*G06F 1/00* (2006.01)
(52) U.S. Cl. ...................... 713/300; 713/320
(58) Field of Classification Search ............... 713/300, 713/320, 340; 323/313
See application file for complete search history.

(56) References Cited

U.S. PATENT DOCUMENTS

| | | | | |
|---|---|---|---|---|
| 3,403,264 | A | * | 9/1968 | Ronback ...................... 307/32 |
| 5,923,545 | A | * | 7/1999 | Nguyen ........................ 363/24 |
| 6,594,556 | B1 | * | 7/2003 | Agatstein et al. ........... 700/298 |
| 7,062,933 | B2 | * | 6/2006 | Burns et al. ................ 62/259.2 |
| 7,085,943 | B2 | * | 8/2006 | Chun et al. .................. 713/300 |

OTHER PUBLICATIONS

Intel, "Low Voltage Intel Xeon Processor at 1.60 GHz, 2.0 GHz and 2.4 GHz", Datasheet, Sep. 2002, Order No. 273766-005.
Intel, "Low Voltage Intel Xeon Processor for Embedded Applications", Thermal Design Guide, Sep. 2003, Order No. 273764-003.
Intel, "Dual Intel Xeon Processor Voltage Regulator Down (VRD)" Design Guidelines, Jul. 2003, Order No. 298644-003.
Intel, "VRM 9.1 DC-DC Converter" Design Guidelines, Jan. 2002, Order No. 298646-001.
Intel, "VRM 9.0 DC-DC Converter", Design Guidelines, Apr. 2002, Order No. 249205-004.
Intel, "Intel Xeon Processor with 533 MHz Front Side Bus at 2 GHz to 3.20 GHz", Feb. 2004, Document No. 252135-006.

* cited by examiner

*Primary Examiner*—Thomas Lee
*Assistant Examiner*—Mark Connolly
(74) *Attorney, Agent, or Firm*—BainwoodHuang

(57) ABSTRACT

Several processors have specifications setting forth that each processor be coupled to a separate specified voltage regulator circuit. Instead, a number of specified voltage regulator circuit(s) is coupled to the several processors. The number of voltage regulator circuit(s) is less than the number of processors. The processors and voltage regulator circuit(s) are coupled to a module, and a thermal limit for the module is maintained because the several processors are coupled to the smaller number of voltage regulator circuits.

8 Claims, 3 Drawing Sheets

US 7,293,181 B2

USE OF ONE VOLTAGE REGULATOR MODULE TO SUPPORT TWO PROCESSORS TO IMPROVE POWER AND THERMAL LIMITATIONS

FIELD OF THE INVENTION

The present invention relates generally to processors driven by voltage regulators, and more particularly to arrangements of processors and voltage regulators for improving thermal margins.

BACKGROUND OF THE INVENTION

As computing, storage, and networking capabilities advance, new and more demanding applications exploit them. These applications, in turn, require an ever increasing need for more computing, storage, and networking capabilities. The continuing technology advances result in systems that operate at higher clock speeds but require more power. As power increases, the thermal profile of the systems rises. In addition, in order to increase the performance of these systems, components must often be added, which requires more space in the systems and more space for housing the systems.

As more powerful applications are developed to utilize these systems, demand for the systems grows. But, the buildings and rooms that the equipment is installed in do not grow. So system enclosure sizes become increasingly important so that more systems can be installed in the same space. But smaller system enclosure sizes work directly against the faster, higher power requirements and increased number of components required on the modules that must fit in the enclosures. Eventually an enclosure size limit is reached because of the power and concomitant thermal limits required for operation. Therefore, there is a need for an enclosure solution that provides high performance along with a lower power and thermal profile so that the size of the enclosure can be minimized.

SUMMARY OF THE INVENTION

In accordance with the invention, a plurality of processors are utilized, wherein the specifications for the processors set forth that each processor be coupled to a separate specified voltage regulator circuit. However, a number of specified voltage regulator circuit(s) is is coupled to the plurality of processors, wherein the number is less than the plurality. In a particular implementation, the processors are Low Voltage Intel® Xeon Processors™, and the voltage regulator circuit is an Intel specified VRM. Two Xeon processors are coupled to one voltage regulator circuit.

In accordance with an aspect of the invention, the processors and voltage regulator circuit(s) is coupled to a module, and a thermal limit for the module is maintained because the processors are all coupled to the number of voltage regulator circuit(s).

The invention provides particular utility in systems having strict power and thermal requirements. For example, the invention is advantageously implemented in a storage system including a plurality of compact enclosures.

BRIEF DESCRIPTION OF THE DRAWINGS

In order to facilitate a fuller understanding of the present invention, reference is now made to the appended drawings. These drawings should not be construed as limiting the present invention, but are intended to be exemplary only.

DETAILED DESCRIPTION OF EXEMPLARY EMBODIMENTS

Figure 1:
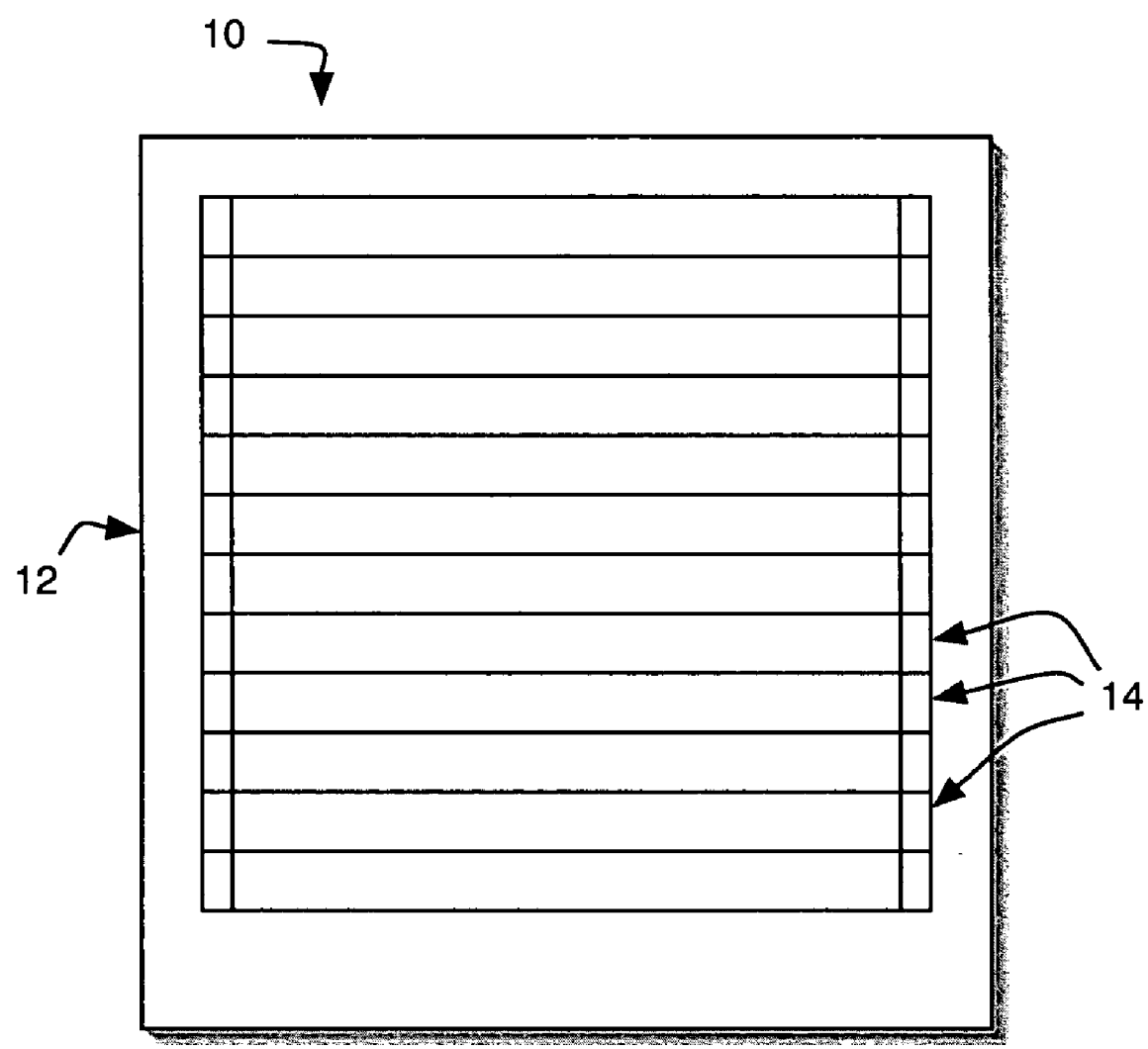
FIG. 1 is a representation of a rack mount server storage system including 1U height enclosures.

Referring to FIG. 1, there is shown a storage system 10 that is one of many types of systems in which the principles of the invention may be employed. The storage system 10 includes a chassis 12 that holds enclosures 14. The enclosures 14 are coupled to banks of disk drives (not shown). In order to maximize the value of the system to the customer, it is desirable to produce enclosures 14 that are as small, dense, and low cost as possible. In order to minimize the size of the enclosure 14, designers must densely pack components on the modules within the enclosures. As component densities increase, power and thermal margins become critical design parameters. In accordance with a preferred implementation of the storage system of FIG. 1, the enclosures 14 conform to a 1U standard form factor, having a 1.75 inch height, 19 inch standard rack mount width, and a depth of about 30 inches or less.

Figure 2:
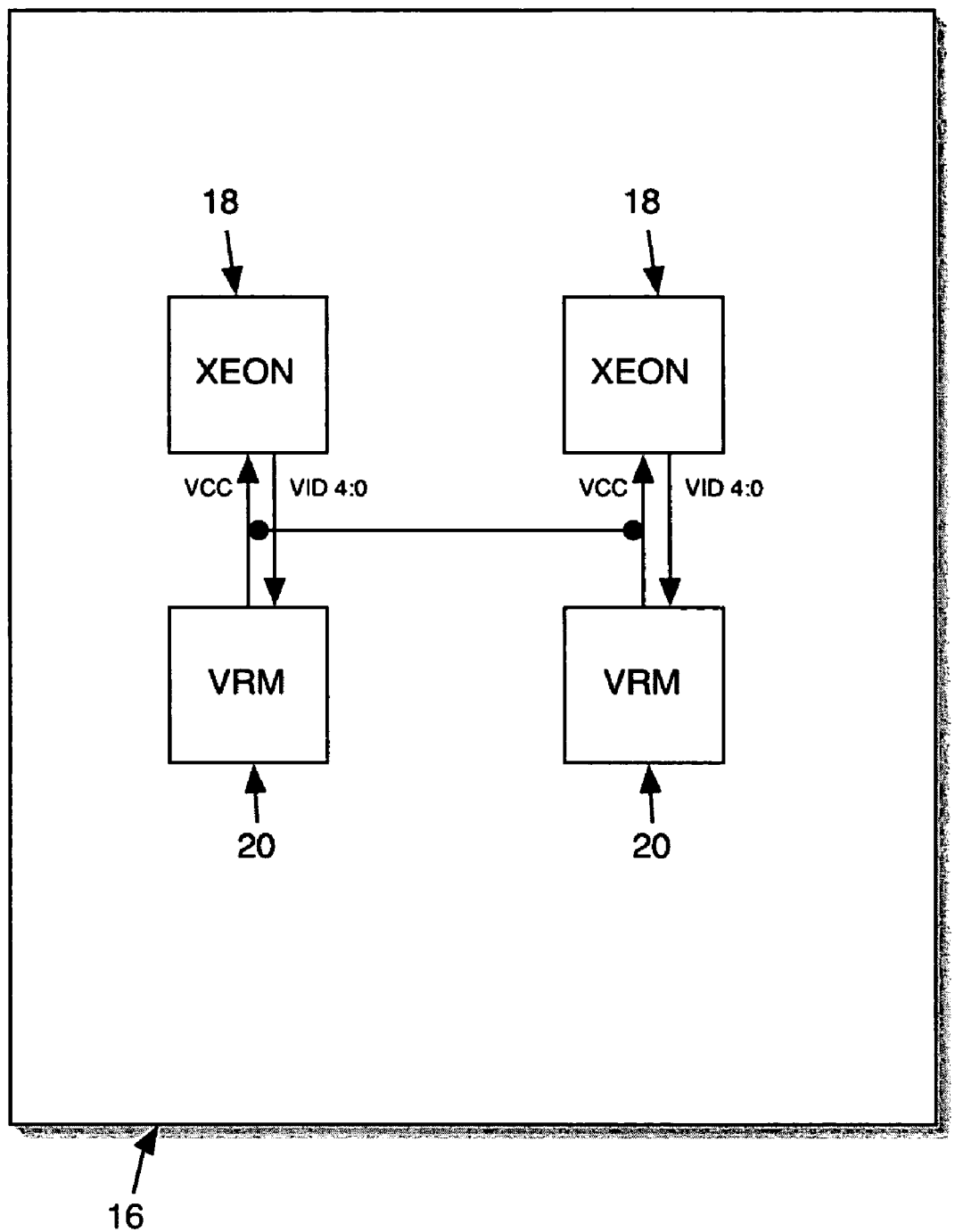
FIG. 2 is a representation of a prior art module including a prior art arrangement of processors and voltage regulator circuits.

In FIG. 2, there is shown a prior art module 16 showing a prior art arrangement of components. The module 16 includes many components including processors 18. In accordance with processor 18 specifications, each processor 18 is coupled to a voltage regulator circuit 20. For example, the processors 18 may be one of various Intel® Xeon™ processors, for instance a processor such as is described in the Intel datasheet "Intel® Xeon™ Processor with 533 MHz Frontside Bus at 2 GHz to 3.20 GHz", Copyright© Intel Corporation 2002-2004 (hereinafter "Xeon spec"). The specification for an Intel Xeon processor specifies that it be coupled to a particular voltage regulator circuit 20, namely a Voltage Regulator Module (VRM) for proper operation. The functionality of the VRM 20 is specified by Intel in the any of the Intel specifications "VRM 9.0 DC-DC Converter Design Guidelines", Copyright© Intel Corporation 2000, 2001, Intel order number 249205; "VRM 9.1 DC-DC Converter Design Guidelines", Copyright© Intel Corporation, Intel order number 298646; "Dual Intel® Xeon™ Processor Voltage Regulator Down (VRD) Design Guidelines", Copyright© Intel Corporation, Intel order number 298644. Various vendors produce VRMs. For example, several VRMs conforming to Intel VRM specifications are available from Artesyn Technologies Inc. ("NSI150", "NSI100"). As shown, each Xeon Processor 18 drives VID<4:0> lines that indicate the operating input voltage that should be provided by the VRM 20 to the Xeon Processor 18. This voltage, and thus the values driven on the VID<4:0> lines, vary according to the particular type of Xeon Processor 18 to which the VRM 20 is coupled. Each VRM 20 in turn provides input voltage (Vcc) to the Xeon Processors 18. Providing a separate voltage regulator circuit 20 for each processor 18 costs valuable space and increases the voltage operating point at which each processor 18 operates. The increased voltage operating point causes the processors to run at higher power, which in turn increases the thermal profile of the module 16. In certain applications, this increased voltage operating point can prevent the prior art module 16 from being utilized in the compact confines of the 1U enclosure 14 of FIG. 1. In other cases, the prior art module of FIG. 2 may be used in a 1U enclosure such as the enclosure 14 with limited functionality and/or a cost or performance disadvantages.

Intel Xeon processors are also produced in a low power version that Intel refers to as a low voltage or "LV" Xeon processor. The specifications for the LV Xeon Processor can be found in the Intel document "Low Voltage Intel® Xeon Processor™ at 1.6 GHz, 2.0 GHz, and 2.4 Ghz", Copyright© Intel Corporation 2003, Intel order number 273766-005 (hereinafter "LV Xeon spec"). The LV Xeon processor includes all the functional capabilities of the regular Xeon processor, but it is capable of operating at a lower input voltage. Because it operates at a lower voltage, it uses about ½ the power of the regular Xeon Processor. However, the specifications for the VRMs specified for use with the LV Xeon processors have not been changed (LV Xeon spec section 2.6).

Figure 3:
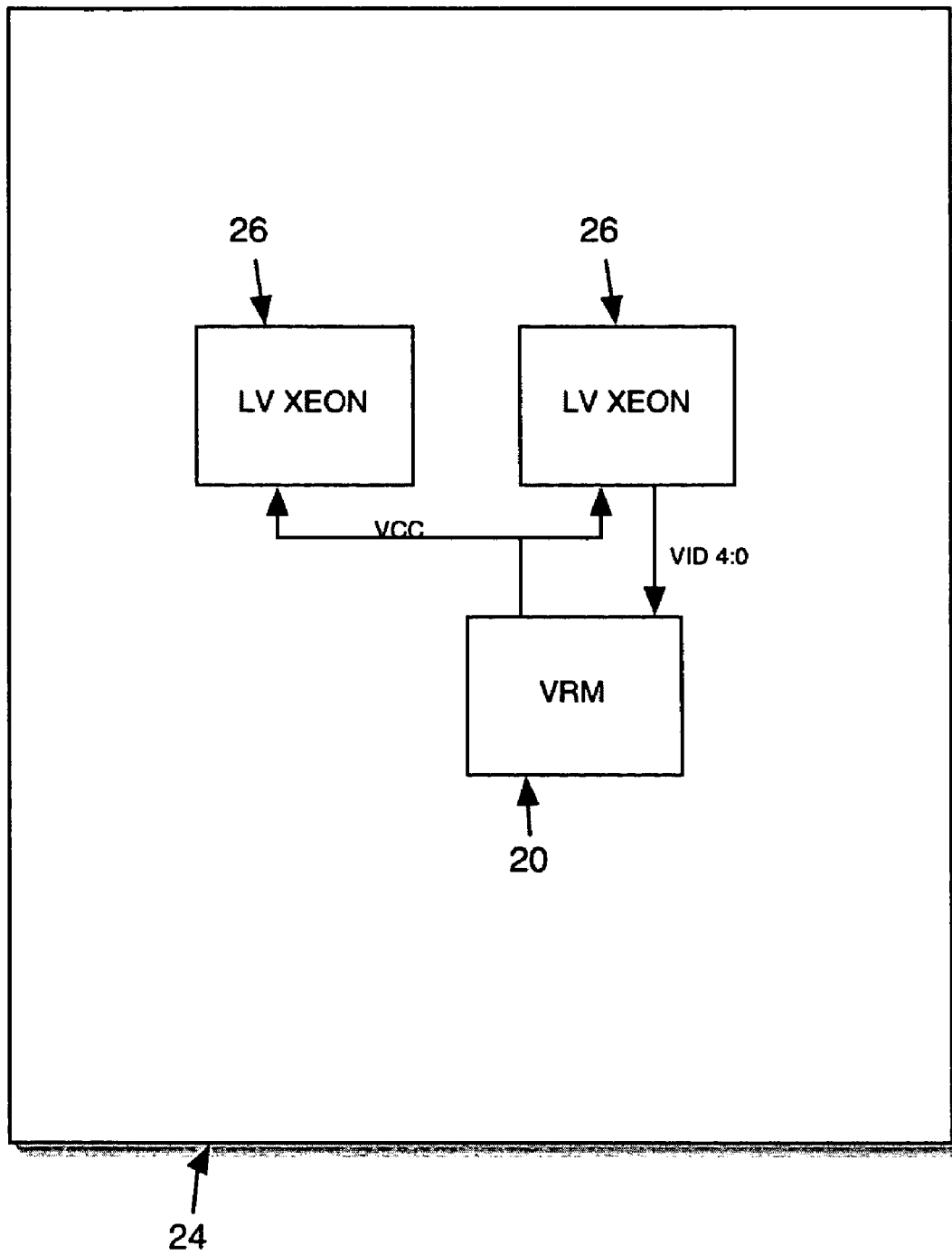
FIG. 3 is a representation of a module in accordance with the invention, for installation in an enclosure of FIG. 1.

Referring to FIG. 3, there is shown a module 24 that is arranged in accordance with the invention. The module includes two Intel LV Xeon processors 26. Both processors 26 are coupled to the same VRM 20. As shown, the VID<4:0> lines are driven by one processor 26, while the single VRM 20 supplies operating voltage (Vcc) to both processors 26. Careful study of the Intel specifications for the LV Xeon processors 26 and the VRM 20 shows that this innovative arrangement causes the LV Xeon processors 26 to run at a lower operating voltage than they would run at if separate VRMs 20 were employed, while staying well within specified operating voltage. Power, thermal, space, and cost advantages are achieved through this arrangement, as will be further described. Furthermore, the arrangement consists of commodity ("off-the-shelf") components—that is, no customization of either the processors or VRM is required in order to achieve the advantages of the invention.

An aspect of the invention lies in the realization that the lower operating voltage causes the processors 26 to run at lower power, significantly improving the thermal profile of the module 24. Intel processors (and processors produced by other vendors) require a high minimum clocking rate when executing code in order to maintain state. The dominant power consumption by the processor is therefore the power dissipated as a result of switching. Power dissipation in a switched environment is known to be proportional to the frequency of switching, the capacitance being switched, and the square of the operating voltage. Therefore, a small change in operating voltage results in a much larger relative change in power dissipated. So, lowering the operating voltage at which the LV Xeon processors 26 run means that a module such as module 24 can be built within a thermal margin that otherwise could not be met, and enables the production of a module 24 and thus an enclosure 14, that could not otherwise be produced and sold.

The innovative realizations that result in the invention are now described in more detail. It can be seen from the Xeon Processor 26 datasheet that thermal design power can range from 55 to about 87 W depending on input voltage. In comparison, thermal design power for the LV Xeon processor, as shown in Table 2 of the Intel datasheet "Low Voltage Intel® Xeon™ Processor for Embedded Applications Thermal Design Guide", Copyright© Intel Corporation 2003, Order Number 273764-003, is shown to range from 30-40 watts depending on frequency. A VRM is specified to provide about 90 W (See VRM 9.0 spec, 65A continuous @ avg. VID 1.4V=91 W min.), so it can be seen that one VRM is sufficient to power two LV processors. But a further unexpected benefit is provided. Referring to the load line curve in the LV Xeon Processor datasheet, it can be seen that, if each LV Xeon processor 26 is coupled to a separate VRM 20, the LV Xeon Processor 26 will operate at the high end of its input voltage range, e.g. 1.27 to 1.28 V, thus causing the processor 26 to operate at higher power. However, if two LV Xeon Processors 26 are coupled to the same VRM 20, it has been found that the higher load seen on the VRM 20 causes the LV Xeon processors 26 to operate in a lower 1.21 to 1.22 V range. This has been shown experimentally to produce significant power savings. The operating power for each processor 26 has been observed at about 17 W running in a storage application, as opposed to around 20 W for the dual VRM solution running the same application. This power savings provides an important 15% reduction in the design budget for heat sinks and/or airflow. The advantages of the single VRM/dual LV Xeon processor design include space savings on the module, lower cost, and sufficient reduction in thermal profile to produce an efficient and competitive 1U enclosure 14 including the module 24. The invention may be applied more generally to achieve its cost, power, thermal, and space savings benefits in a variety of environments. A designer implementing the invention should consider various design parameters to choose a particular processor/VRM arrangement that maximizes the benefits of the arrangement in the particular environment in which it is used. A designer should consider, amongst other things, how heavily the processors will be loaded by the specific application in which the arrangement will be used. This processor loading will in turn affect the load seen by the VRM. Furthermore, connectors between the VRM and processors, and PCB delivery of power to each CPU (e.g. etch lengths, widths) affect the load seen by the VRM. Also, VRMs from different vendors may have different load regulation specifications. Understanding these various loading parameters allows selection of a particular VRM to maximize power and thermal benefits. For example, where LV Xeon processors and Intel specified VRMs are employed, in an environment where the application load on the processors is relatively light, the VRM specified by the VRM 9.0 Design Guidelines may provide maximum benefit. On the other hand, in an environment where the application load on the processors is heavier, a designer may instead utilize a VRM specified by the VRM 9.1 Design Guidelines, which specify tighter voltage regulation over the loading range, in order to ensure that processor operating voltage remains within specification.

The principles of the invention can be further extended to other processor and voltage regulator arrangements. For example, it is conceivable that a quad processor arrangement could be sufficiently powered by a single VRM so that the operating voltage of all four processors is reduced while remaining within specifications, but significantly reducing the power dissipation of the quad processors. Thus, the invention broadly addresses an arrangement of a plurality of processors, wherein the specifications for the processors set forth that each processor be coupled to a separate specified voltage regulator circuit. However, fewer than the specified number of voltage regulator circuits is coupled to the plurality of the processors.

The present invention is not to be limited in scope by the specific embodiments described herein. Indeed, various modifications of the present invention, in addition to those described herein, will be apparent to those of ordinary skill in the art from the foregoing description and accompanying drawings. Thus, such modifications are intended to fall within the scope of the invention. For example, though the preferred embodiment of the invention includes Intel Xeon processors and Intel specified VRMs, the principles of the invention can be applied to any processors and voltage regulator circuits in any environment where it would be advantageous to use a single voltage regulator circuit for more than one processor rather than a specified voltage regulator circuit for each processor. Further, although aspects of the present invention have been described herein in the context of a particular implementation in a particular environment for a particular purpose, those of ordinary skill in the art will recognize that its usefulness is not limited thereto and that the present invention can be beneficially implemented in any number of environments for any number of purposes. For example, the preferred embodiment of the invention has been described in terms of a storage system. However, the principles of the invention can be applied in many other types of environments, including network equipment, computer systems, and various other types of systems where cost, density, and/or thermal margins are important.

I claim:

1. Apparatus comprising:
a plurality of processors, wherein the specifications for the processors set forth that each processor be coupled to a separate specified voltage regulator circuit; and
a number of said specified voltage regulator circuit(s) coupled to the plurality of processors, wherein the number is less than the plurality;
wherein each of said specified voltage regulator circuit(s) is a voltage regulation module (VRM), each VRM being removable in a modularized manner from the plurality of processors, each VRM being replaceable;
wherein the plurality of processors includes a first processor and a second processor;
wherein the apparatus includes exactly one VRM which is constructed and arranged to connect with and disconnect from the first processor and the second processor via a set of connectors, the exactly one VRM being configured to provide a single operating voltage to the first and second processors which is lower than a combined operating voltage provided by two VRMs to the first and second processors to decrease power dissipation by the first and second processors and increase thermal margin for the first and second processors; and
wherein the VRM includes a five bit voltage identification input, the five-bit voltage identification input being connected to and receiving voltage commands from the first processor, while the second processor is isolated from the five-bit voltage identification input to prevent the second processor from providing voltage commands to the VRM.

2. The apparatus of claim 1 wherein the processors and the voltage regulator circuit are coupled to a module, and wherein a thermal limit for the module is maintained because the plurality of processors are coupled to the number of voltage regulator circuit(s).

3. Apparatus comprising:
a module having a thermal limit;
the module having coupled thereto a plurality of processors, wherein the specifications for the processors set forth that each processor be coupled to a separate specified voltage regulator circuit;
the module also having coupled thereto a number of said specified voltage regulator circuit(s) coupled to the plurality of processors;
wherein the number is less than the plurality;
wherein said thermal limit is maintained because the plurality of processors are coupled to the number of voltage regulator circuit(s);
wherein each of said specified voltage regulator circuit(s) is a voltage regulation module (VRM) attached to the module, each VRM being removable in a modularized manner from the module, each VRM being replaceable;
wherein the plurality of processors includes a first processor and a second processor;
wherein the apparatus includes exactly one voltage regulation module which is constructed and arranged to connect with and disconnect from the first processor and the second processor via a set of connectors, the exactly one voltage regulation module being configured to provide a single operating voltage to the first and second processors which is lower than a combined operating voltage provided by two voltage regulation modules to the first and second processors to decrease power dissipation by the first and second processors and increase thermal margin for the first and second processors; and
wherein the VRM includes a five bit voltage identification input, the five-bit voltage identification input being connected to and receiving voltage commands from the first processor, while the second processor is isolated from the five-bit voltage identification input to prevent the second processor from providing voltage commands to the VRM.

4. Apparatus for a storage system comprising:
an enclosure for installation in the storage system;
a module in the enclosure having a thermal limit;
the module having coupled thereto a plurality of processors, wherein the specifications for the processors set forth that each processor be coupled to a separate specified voltage regulator circuit;
the module also having coupled thereto a number of said specified voltage regulator circuit(s) coupled to the plurality of processors
wherein the number is less than the plurality;
wherein said thermal limit is maintained because the plurality of processors are both coupled to the number of voltage regulator circuit(s);
wherein each of said specified voltage regulator circuit(s) is a voltage regulation module (VRM) attached to the module, each VRM being removable in a modularized manner from the module, each VRM being replaceable;
wherein the plurality of processors includes a first processor and a second processor;
wherein the apparatus includes exactly one voltage regulation module which is constructed and arranged to connect with and disconnect from the first processor and the second processor via a set of connectors, the exactly one voltage regulation module being configured to provide a single operating voltage to the first and second processors which is lower than a combined operating voltage provided by two voltage regulation modules to the first and second processors to decrease power dissipation by the first and second processors and increase thermal margin for the first and second processors; and
wherein the VRM includes a five bit voltage identification input, the five-bit voltage identification input being connected to and receiving voltage commands from the first processor, while the second processor is isolated from the five-bit voltage identification input to prevent the second processor from providing voltage commands to the VRM.

5. A method comprising the steps of:
utilizing in a system a plurality of processors, wherein the specifications for the processors set forth that each processor be coupled to a separate specified voltage regulator circuit; and
coupling a number of said specified voltage regulator circuit(s) to the plurality of processors, wherein the number is less than the plurality;
wherein each of said specified voltage regulator circuit(s) is a voltage regulation module (VRM), each VRM being removable in a modularized manner from the plurality of processors, each VRM being replaceable;
wherein the plurality of processors includes a first processor and a second processor;
wherein the apparatus includes exactly one VRM which is constructed and arranged to connect with and disconnect from the first processor and the second processor via a set of connectors;
wherein the method further comprises configuring the exactly one VRM to provide a single operating voltage to the first and second processors which is lower than a combined operating voltage provided by two VRMs to the first and second processors to decrease power dissipation by the first and second processors and increase thermal margin for the first and second processors; and
wherein the VRM includes a five bit voltage identification input, the five-bit voltage identification input being connected to and receiving voltage commands from the first processor, while the second processor is isolated from the five-bit voltage identification input to prevent the second processor from providing voltage commands to the VRM.

6. The method of claim 5 wherein a thermal limit for the system is maintained because the plurality of processors are coupled to the number of voltage regulator circuit(s).

7. A method comprising:
coupling a plurality of processors to a module having a thermal limit, wherein the specifications for the processors set forth that each processor be coupled to a separate specified voltage regulator circuit; and
coupling a number of said specified voltage regulator circuit(s) to the plurality of processors on the module;
wherein the number is less than the plurality;
wherein said thermal limit is maintained because the plurality of processors are coupled to the one voltage regulator circuit;
wherein each of said specified voltage regulator circuit(s) is a voltage regulation module (VRM) attached to the module, each VRM being removable in a modularized manner from the module, each VRM being replaceable;
wherein the plurality of processors includes a first processor and a second processor;
wherein the apparatus includes exactly one VRM which is constructed and arranged to connect with and disconnect from the first processor and the second processor via a set of connectors;
wherein the method further comprises configuring the exactly one VRM to provide a single operating voltage to the first and second processors which is lower than a combined operating voltage provided by two VRMs to the first and second processors to decrease power dissipation by the first and second processors and increase thermal margin for the first and second processors; and
wherein the VRM includes a five bit voltage identification input, the five-bit voltage identification input being connected to and receiving voltage commands from the first processor, while the second processor is isolated from the five-bit voltage identification input to prevent the second processor from providing voltage commands to the VRM.

8. A method for use in for a storage system comprising the steps of:
providing an enclosure for installation in the storage system;
providing a module for installation in the enclosure, the module having a thermal limit;
coupling to the module a plurality of processors, wherein the specifications for the processors set forth that each processor be coupled to a separate specified voltage regulator; and
coupling to the module a number of said specified voltage regulator circuit(s) coupled to the plurality of the processors;
wherein the number is less than the plurality;
wherein said maximum thermal limit is maintained because the plurality of processors are coupled to the number of voltage regulator circuit(s);
wherein each of said specified voltage regulator circuit(s) is a voltage regulation module (VRM) attached to the module, each VRM being removable in a modularized manner from the module, each VRM being replaceable;
wherein the plurality of processors includes a first processor and a second processor;
wherein the apparatus includes exactly one VRM which is constructed and arranged to connect with and disconnect from the first processor and the second processor via a set of connectors;
wherein the method further comprises configuring the exactly one VRM to provide a single operating voltage to the first and second processors which is lower than a combined operating voltage provided by two VRMs to the first and second processors to decrease power dissipation by the first and second processors and increase thermal margin for the first and second processors; and
wherein the VRM includes a five bit voltage identification input, the five-bit voltage identification input being connected to and receiving voltage commands from the first processor, while the second processor is isolated from the five-bit voltage identification input to prevent the second processor from providing voltage commands to the VRM.

* * * * *